(12) United States Patent
Becher

(10) Patent No.: US 6,545,987 B1
(45) Date of Patent: Apr. 8, 2003

(54) METHOD AND SERVICE SWITCHING POINT FOR REQUESTING INFORMATION DURING INCOMING CALLS TO A SUBSCRIBER IN A COMMUNICATIONS NETWORK

(75) Inventor: Reinhard Becher, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/677,405

(22) Filed: Oct. 2, 2000

Related U.S. Application Data

(63) Continuation of application No. PCT/DE99/00817, filed on Mar. 22, 1999.

(30) Foreign Application Priority Data

Mar. 30, 1998 (DE) .......................................... 198 14 162

(51) Int. Cl.[7] ................................................. H04Q 7/00
(52) U.S. Cl. ........................ 370/328; 455/422; 455/435
(58) Field of Search ................................. 370/328, 385, 370/352–356, 310, 329, 341, 431; 455/422, 432, 433, 435, 428

(56) References Cited

U.S. PATENT DOCUMENTS 5,423,043 A * 6/1995 Fitzpatrick et al. ......... 364/286
5,708,702 A * 1/1998 De Paul et al. ............. 379/230
6,181,935 B1 * 1/2001 Gossman et al. ........... 455/433

OTHER PUBLICATIONS

Published International Application No. WO 97/48245 (Janhonen et al.), dated Dec. 18, 1997.
Published International Application No. WO 96/34502 (Sharp et al.), dated Oct. 31, 1996.
Published International Application No. WO 97/31491 (Low et al.), dated Aug. 28, 1997.
Published International Application No. WO 96/13949 (Huotari et al.), dated May 9, 1996.
"Alternative Methods for Introducing New Wireless Intelligent Network Services Using Triggers and Queries".
"Camel: The Impact of Personal Communications on Intelligent Networks".
"The Camel Feature", Customised Applications for Mobile network Enhanced Logic, dated Mar. 1995, Version 0.5.0, pp. 1–19.

* cited by examiner

*Primary Examiner*—Ajit Patel
(74) *Attorney, Agent, or Firm*—Laurence A. Greenberg; Werner H. Stemer; Ralph E. Locher

(57) ABSTRACT

The method for information transmission sends trigger information from the subscriber database to the service switching point that is currently responsible for the subscriber, and a trigger event is then stored with it in the service switching point. When the trigger event is present, the information is requested directly from a service control point by the service switching point. In this way, information can be called from the service control point both while connection is being set up and during an already existing connection, and can be made available to the subscriber or to his communications terminal. The direct request for information via a trigger event that can be predetermined is possible at any time by means of the invention, and is not limited to a single check before setting up a connection.

17 Claims, 4 Drawing Sheets

METHOD AND SERVICE SWITCHING POINT FOR REQUESTING INFORMATION DURING INCOMING CALLS TO A SUBSCRIBER IN A COMMUNICATIONS NETWORK

CROSS-REFERENCE TO RELATED APPLICATION

This is a continuation of copending international application PCT/DE99/00817, filed Mar. 22, 1999, which designated the United States.

BACKGROUND OF THE INVENTION

Field of the Invention

The invention relates to a method and a service switching point for requesting information during incoming calls to a subscriber in a communications network.

Communications networks are, for example, in the form of fixed networks or radio networks—such as the known GSM mobile radio network (Global System for Mobile Communications)—and have switching devices which are networked with one another. In mobile radio networks, base stations are in each case connected to the switching devices and allow communications terminals to be connected via an air interface. These communications terminals allow a radio subscriber in the radio network access to the network. Furthermore, the switching device can handover the subscriber and communicated-terminal to other networks, for example data transmission networks or a fixed network.

The GSM mobile radio network teaches subscriber databases to be used as memory units in which subscriber-specific data—for example relating to the services for which the subscriber has registered—are in each case stored. One of these memory units provides the so-called home location register which, as a rule, is located at a permanently defined point and in which the data on which the registration of the subscriber are based are stored. Depending on the present location of the mobile subscriber, one memory unit is provided as a so-called visitor location register. Depending on the location of the mobile subscriber, the memory unit for the visitor location register in which the data that are specific for this subscriber are located also changes.

Known communications networks support additional services for the subscribers by forming an intelligent network (IN) using service control points. Such a communication network can be a fixed network or a mobile radio network. These service control points store profiles of the additional services. The control points and profiles include the information required to provide the additional services and can thus change the additional services independently of the respective communications network. In this case, the services that can be used in an intelligent network are initiated in a service switching point. This brings about an exit from the normal call processing and activates the access to the additional services. A CAMEL platform (Customized Application for Mobile network Enhanced Logic) is known from "The CAMEL feature, proposed revisions to the stage 1 description", from ETSI/STC/SMG1. 14.03.95, GSM 02.78, Version 0.4.0, pages 1–14, which makes possible the support of additional provider-specific services for subscribers, for example even when such subscribers are abroad. An operator-specific additional service can thus be used beyond the network and service boundaries of a communications network. This is the situation when the service switching point that initiates the additional service can process the required (CAP) signalling (CAMEL Application Part) for the requested service. Then, signaling information can be interchanged beyond the network boundaries, from and to the home location register, and to the service control point of the additional service.

When a call connection is initiated, the switching device responsible for the incoming call carries out a two-stage location interrogation. In the first stage, the switching device sends a request to the home location register to initiate a dialogue with a service control point, provided an IN/CAMEL subscription entry exists for the subscriber. In the second stage, the switching device requests the home location to request for a mobile subscriber roaming number from a switching device that is currently controlling the radio subscriber being called, and transmit this to the switching device responsible for the incoming call. In the process, the service control point transmits information such as parameters relating to call charging. However, the service control point only transmits this information once in the course of this two-stage interrogation procedure. Accessing data and parameters in the service control point later is impossible. This means that any new information for the called subscriber must be restandardised in each individual case, and a corresponding transmission medium—for example a new message container—must be provided. Furthermore, the only information that can be transmitted is the information available with the interrogation of the service control point at the time when the connection is set up.

SUMMARY OF THE INVENTION

It is accordingly an object of the invention to provide a method and service switching point for requesting information during incoming calls to a subscriber in a communications network that overcomes the described disadvantages of the heretofore-known devices of this general type and that improves information transmission during incoming calls.

With the foregoing and other objects in view, there is provided, in accordance with the invention, a method for requesting connection information during incoming calls, during and after the setting up of a connection, to a subscriber in a communications network. The method includes the following steps. Providing communications terminals connected to further devices. The communications terminal granting access to subscribers. Further providing networked switching devices connected to the communications terminals. The networked switching devices handing over subscribers to a further network. Further providing a subscriber database for storing data relating to the subscribers registered in the communications network. And, further providing a service switching point and a service control point for administering services. Sending information-request trigger information from the subscriber database during a connection setting-up procedure to the service switching point that is currently responsible for the subscriber. Storing an information-request trigger event in the service switching point. And, requesting the information directly from a service control point by the service switching point when the information-request trigger event is present.

In accordance with another feature of the invention, the method further includes the following step. Transmitting data and parameters from the service control point via the service switching point to the communications terminal.

In accordance with another feature of the invention, the data and parameters are passed on transparently from the service switching point to the communications terminal.

In accordance with another feature of the invention, the method includes the following additional steps. Processing the data and parameters with the service switching point. And, passing the processed data and parameters to the communications terminal.

In accordance with another feature of the invention, the service control point has an address stored with the information-request trigger information in the service switching point.

In accordance with another feature of the invention, the method includes the following additional steps. Sending the information-request trigger information from the subscriber database upon receipt of a request from the switching device, which receives an incoming call. Requesting an indicator for the information directly from the service control point on the basis of an initiating message from the switching device. And, sending the information-request trigger information together with the indicator from the switching device via the subscriber database to the service switching point, in a request for transmission of a mobile subscriber roaming number, the mobile subscriber roaming number identifying the location of the subscriber.

In accordance with another feature of the invention, the method can include the following additional step. Sending the information-request trigger information from the subscriber database to the service switching point in a message used for updating the location of the subscriber.

In accordance with another feature of the invention, the method can include the following additional steps. Using the correlation information in the service control point and the service switching point. And, associating the information requested directly from the service control point with the respective call.

In accordance with another feature of the invention, the method includes the following additional steps. Sending a set of a plurality of parameters from the service control point. Calculating a call charge from a first of the plurality of parameters before any tariff switching determined by the service switching point. And, calculating a call charge from a second of the plurality of parameters after the tariff switching.

In accordance with another feature of the invention, the method can include the following additional steps. Sending further parameters from the service control point after any tariff switching determined by the service control point. And, then calculating the call charge.

In accordance with another feature of the invention, the method can include the following additional step. After an information-request trigger event is satisfied, requesting, receiving, and sending to the communications terminal information from an Internet service unit with the service switching point.

In accordance with another feature of the invention, the method can include the following additional steps. Sending correlation information from the service switching point to the service control point by which the Internet service unit requests the correlation information and associates the correlation information with the respective call.

With the foregoing and other objects in view, there is provided, in accordance with the invention, a service switching point assembly for requesting information during incoming calls to a subscriber in a communications network. The service switching point assembly includes communications terminals accessed by subscribers. The service switching point assembly also includes networked switching devices connected to the communications terminals and a networked switching device accessed by subscribers with the communication terminals and connected via further devices. The network switching device also hands over the communications terminals to a further network. The service switching point assembly also includes a service switching point and a service control point for administering services. The service switching point has a memory device for storing an information-request trigger event on the basis of information-request trigger information sent from the subscriber database, and a control device for producing a message which is sent directly to the service control point when the information-request trigger event for requesting information is present.

In accordance with another feature of the invention, the memory device can store data and parameters transmitted from the service control point, and the control device can initiate the sending of the data and parameters to the communications terminal.

In accordance with another feature of the invention, the memory device stores an address of the service control point, from which the information can be requested with the information-request trigger information.

In accordance with another feature of the invention, the control device receives the information-request trigger information together with an indicator for the information which can be directly requested, in a request to transmit a mobile subscriber roaming number, which identifies the location of the subscriber, and having the memory device which stores the information-request trigger information together with the indicator.

In accordance with another feature of the invention, the control device receives the information-request trigger information from the subscriber database in a message that is provided for updating the location of the subscriber.

As stated, the object of the invention is to specify a method and a service switching point by means of which the information transmission during incoming calls can be improved.

The method for information transmission according to the invention provides that trigger information is sent from the subscriber database to the service switching point that is currently responsible for the subscriber, and a trigger event is then stored with it in the service switching point. When the trigger event is present, the information is requested directly from a service control point by the service switching point. In this way, information can be called from the service control point both while connection is being set up and during an already existing connection, and can be made available to the subscriber or to his communications terminal. The invention provides for a direct request of information via a predetermined trigger event at any time. The invention enables data and parameters to transmit between the service control point and the service switching point or the switching device controlling the subscriber being called (Visited MSC) and/or the communications terminal, without any need to change messages between the access switching device (Gateway MSC), the subscriber databases and the service switching point for this purpose. This improves the signaling traffic and flexibility of information transmission, particularly with regard to new information. Respective adaptation of the standardized transmission methods for information, which are not yet known or are not yet ready for application, is unnecessary. This optimizes cooperation between the service control point and the communications terminal—either directly or via a service switching point— even while a connection is being set up or during the connection.

According to a development of the invention, an address of the service control point from which the information can be requested is stored with the trigger information in the service switching point.

According to an advantage of the invention, the trigger information is sent from the subscriber database. The trigger information is sent after a request from the switching device that receives the incoming call. Then, an indicator for the information that can be requested directly is sent from the service control point on the basis of an initiating message from the switching device. The two information items are then sent jointly from the switching device via the subscriber database to the service switching point, in a request for transmission of a mobile subscriber roaming number which identifies the location of the subscriber. The information that results in the triggered request for information is thus passed to the service switching point using the two-stage interrogation process.

According to an advantageous development of the invention, which is an alternative to this, the trigger information is sent from the subscriber database to the service switching point in a message that is used for updating the location of the subscriber. Thus, the triggered request for information also can be initiated in a direct way by using an updating process that exists in the network. This procedure requires particularly little effort with regard to signalling traffic.

Another development of the invention provides for correlation information to be used by the service control point and by the service switching point. To form this association, the information requested directly from the service control point is associated with the respective call. This ensures a reliable association between the information provided and the respective call even if more than one request is triggered.

One particular variant of the invention provides that when a trigger event is satisfied, the service switching point requests, receives, and sends to the communications terminal information from an Internet service unit (Web server).—Preferably, the information is communicated via a service control point. Such communication enables transmissions from other service units. An example of such a service unit is a Web server. Information from such service units, such as stored e-mails, advertising, and the like can be transmitted directly to the subscriber or his communications terminal.

The service switching point according to the invention has a memory device. The memory storage device stores the trigger event on the basis of the trigger information sent from the subscriber database. The service switching point also has a control device for producing a message, which is sent directly to the service control point in order to request information when the trigger event is present.

Other features that are considered as characteristic for the invention are set forth in the appended claims.

Although the invention is illustrated and described herein as embodied in a method and service switching point for requesting information during incoming calls to a subscriber in a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
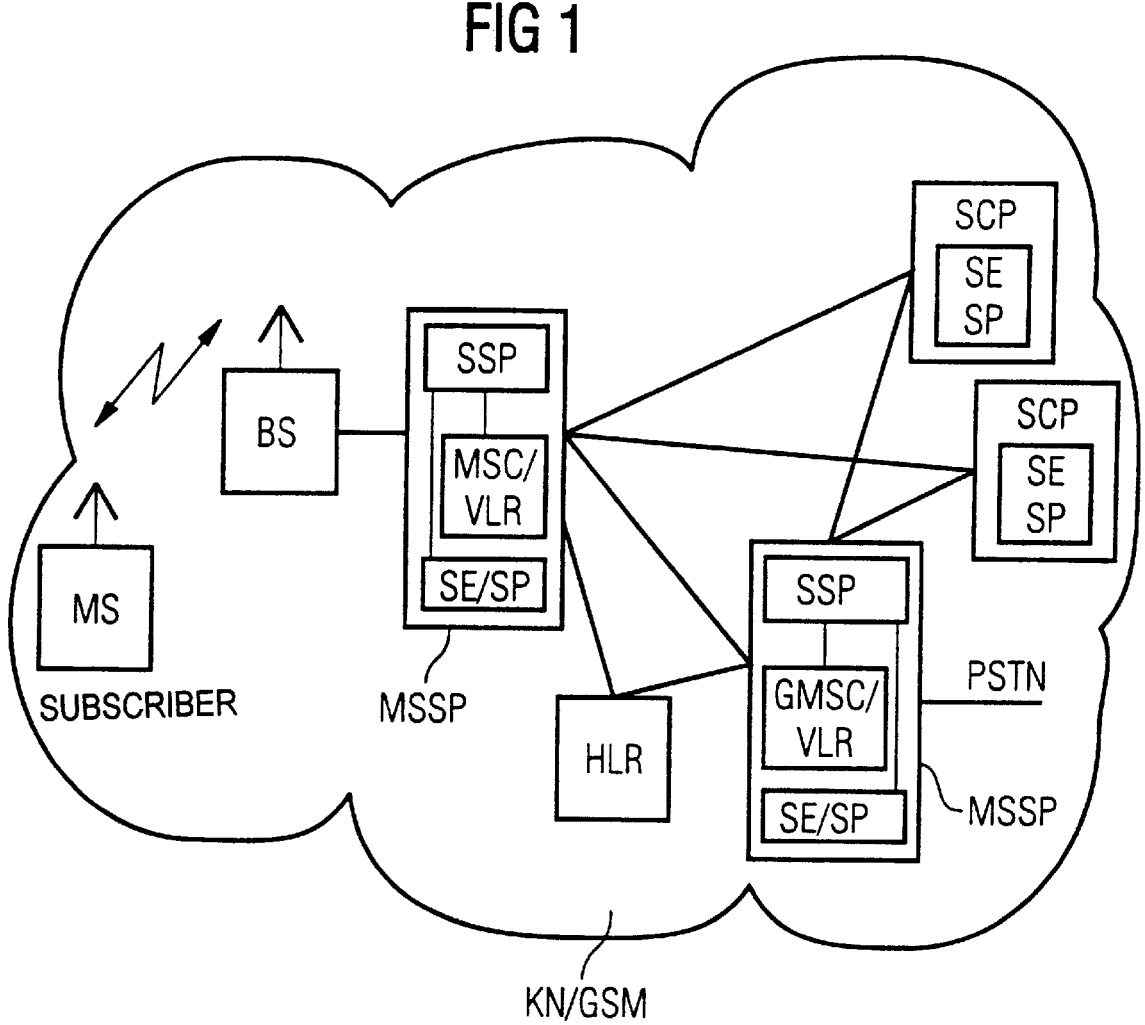
FIG. 1 shows the block diagram of a communications network.

FIG. 1 shows, as a communications network, a mobile radio network operated in accordance with the GSM standard using the method of the invention. The invention is not limited to mobile networks using GSM technology but can likewise be used in other networks and with other access techniques. The communications network KN normally has a plurality of switching devices MSC/VLR, which are connected to one another. A switching device MSC/VLR produces the connection to a subscriber via a base station BS, which is connected by cable to the switching device, VLR/MSC, and via an air (also known as a wireless) interface between the base station BS and a mobile station MS. The mobile station MS is the communications terminal of a subscriber A, who initiates outgoing calls (MOC, Mobile Originated Call) or of a subscriber B who receives incoming calls (MTC, Mobile Terminated Call). A further switching device GMSC/VLR forms the network junction with a further network, for example a fixed network PSTN.

Furthermore, the communications network KN has service control points SCP (according to CAMEL Phase 1, also referred to as CSE—CAMEL Service Environment) and service switching points SSP for supporting the network structure of an intelligent network. In this case, one service switching point SSP together with the switching device MSC/VLR or the switching device GMSC/VLR in each case forms a service switching point MSSP, which acts on the interface between the communications network KN and the intelligent network. With these connections, there is no need for each service control point SCP to be connected directly to each switching device MSC/VLR or GMSC/VLR or to each service switching point MSSP—as shown in the block diagram. It is sufficient for them to be accessible via the communications network KN or other networks by means of No. 7 signaling. In the present example, there are two service control points SCP in the communications network KN and these are connected directly to the two service switching points SSP via INAP signalling (Intelligent Network Application Part) or via CAP signalling (CAMEL Application Part). It is also possible to use MAP signalling (Mobile Application Part) for interchanging information between the devices in the mobile radio network GSM. According to FIG. 1, a subscriber database HLR is arranged as the home location register of the subscriber A,B as an autonomous memory unit in the communications network KN, which is connected to the switching devices MSC/VLR, GMSC/VLR shown by way of example. The two switching devices VLR/MSC, GMSC/VLR also contain a subscriber database, the visitor location register VLR, which stores the subscriber data of the subscriber A,B for as long as the mobile subscriber is located in the base station area of the respective switching device. Both the service control points SCP and the service switching points MSSP each have a memory device SP and a control device SE.

Incoming calls to the radio subscriber B, for example from the fixed network PSTN, reach the switching device GMSC/VLR at the network junction, and this switching device initiates and processes the setting up of a connection on the basis of the arriving mobile subscriber call number (MSISDN). On the basis of an interrogation of the switching device GMSC/VLR, the home location register HLR supplies trigger information and sends this to the service switching point MSSP that is currently responsible for the subscriber. The trigger information is used to store a trigger event in the service switching point so that, when the trigger event is present, data and parameters are requested directly from a service control point SCP by the service switching point MSSP. The triggering of the request according to the invention is preferably also used, on the basis of an SCP address included in the trigger information, to select the service control point SCP that is intended to provide the information. In this way, information can be called from the service control point both while a connection is being set up and during an already existing connection, and can be made available to the subscriber B or to the subscriber's communications terminal MS. In principle, a request for information via a trigger event, which can be predetermined, is possible at any time and is not limited to a single call before a connection is set up. This is a considerable improvement in terms of signalling traffic and flexibility of information transmission, particularly in the case of new information.

According to an alternative procedure, the trigger information can be sent to the service switching point MSSP with the trigger event and the SCP address from the subscriber database HLR in a message (location update) for updating the location of the subscriber, and can be stored in said service switching point MSSP. The triggering of the request for information according to the invention thus also can be initiated directly by utilizing the location-update procedure that is available and used in the network. This type of triggering involves particularly little effort with regard to signalling traffic.

To request the information according to the invention, each service switching point MSSP has the memory device SP for storing the trigger event on the basis of the trigger information sent from the subscriber database HLR, and the control device SE for producing a request, which is sent directly to the addressed service control point SCP when the trigger event for transmitting information is present.

Figure 2:
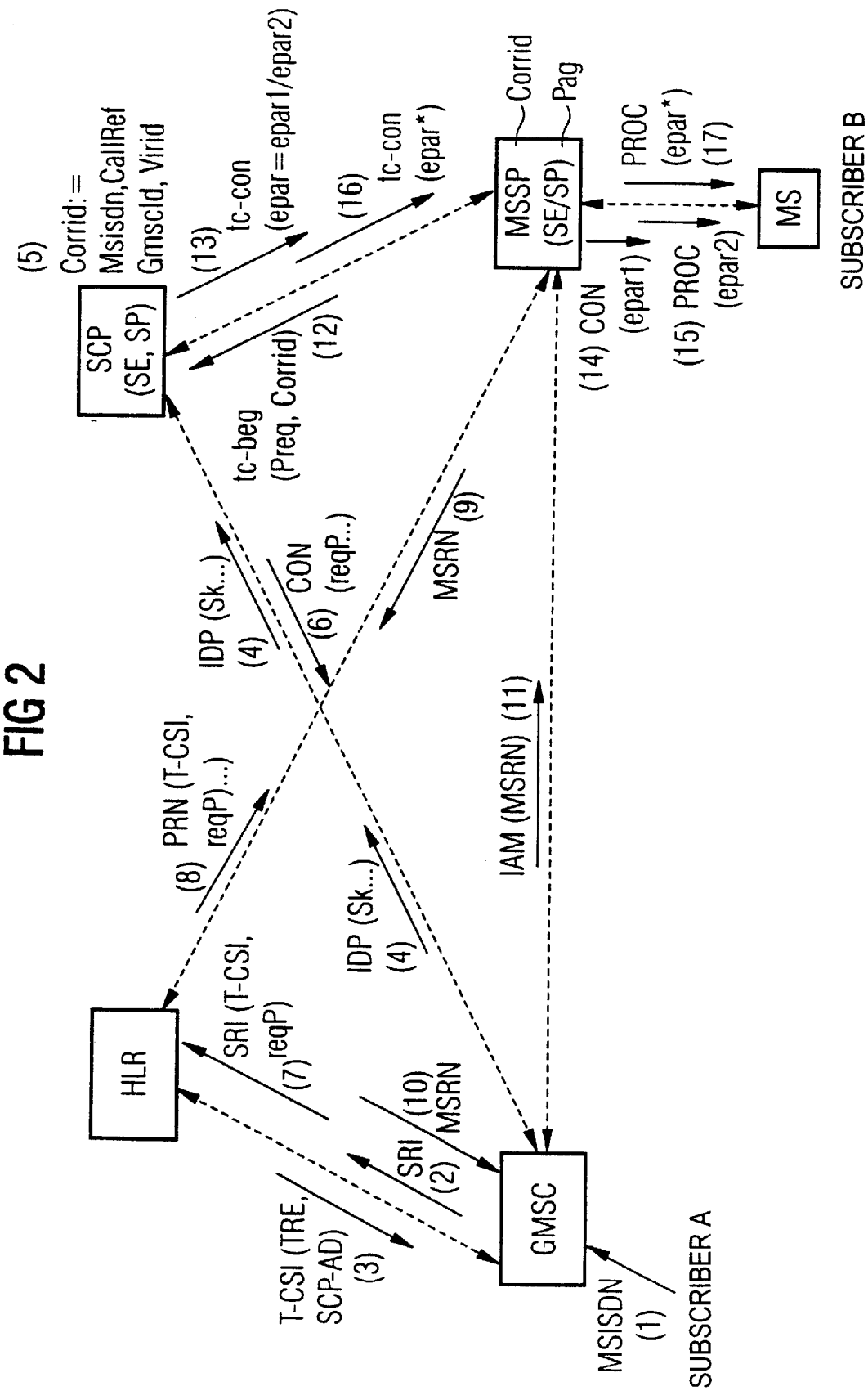
FIGS. 2–4 show a schematic illustration of the devices involved in the method according to the invention, with the corresponding message flow for various information transmission situations.

FIG. 2 shows the message flow between the devices involved in the setting up of a connection. These are the switching device GMSC, the home location register HLR, the service control point SCP (with the memory device SP and the control device SE), the service switching point MSSP (with the memory device SP and the control device SE) and the communications terminal MS. The subscriber A (preferably, in the fixed network) initiating the call dials the mobile subscriber call number MSISDN of the radio subscriber B. The switching device GMSC receives the call of the mobile radio network at the network junction (1). The switching device GMSC then sends a request SRI (Send Routing Info) to the home location register HLR (2) which has stored trigger information T-CSI (Trigger-CAMEL Subscription Identity) for the radio subscriber. The trigger information T-CSI defines a trigger event TRE and an address SCP-AD of the service control point SCP from which the information can be requested by the service switching point MSSP if the trigger event TRE is present. Currently, the switching device is currently responsible for the subscriber B. The home location register HLR thus sends the trigger information T-CSI back to the requesting switching device GMSC (3).

The switching device GMSC then sends an initiating message IDP (Initial Detection Point) with a number of parameters.

Preferably, these parameters include a service key Sk, a mobile subscriber call number Msisdn, an identifier GmscId for the switching device GMSC, and an identifier VlrId for the visitor location register and a call identifier CallRef to the service control point SCP (4). In the process, the signalling is completed on a transaction-related basis, for example using the CAP protocol.

The memory device SP of the service control point SCP stores the arriving parameters and uses the parameters Msisdn, GmscId, VlrId, and CallRef to generate correlation information CorrId (5). This correlation information CorrId is used by the service control point SCP in the same way as the service switching point MSSP in order to associate the information requested directly from the service control point SCP with the respective call. As the response to the initiating message, IDP, the service control point SCP sends a message CON (Connect) with an indicator reqp (request Parameter) back to the switching device GMSC (6). The indicator reqP indicates that the information can be called from the addressed service control point SCP irrespective of the triggering of the request at a later time. Preferably, this occurs even while a connection is in existence.

The switching device GMSC produces a second request SRI to the home location register HLR (7). The request SRI contains the trigger information T-CSI and the indicator reqp. The home location register HLR inserts the trigger information T-CSI and the indicator reqP in a request PRN (Provide Roaming Number) for transmission of a mobile subscriber roaming number. The mobile subscriber roaming number identifies the location of the subscriber B. The home location register HLR also sends this to the service switching point MSSP with the switching device that controls the subscriber B (8). The mobile subscriber roaming number MSRN is read from the memory device SP of the service switching point MSSP, and is sent back to the requesting home location register HLR (9). The service switching point MSSP also stores the correlation information CorrId, in order to have a unique reference to the respective call for the triggered request for information between the data switching point MSSP and the service control point SCP. The correlation information CorrId is preferably sent directly from the service control point SCP to the service switching point MSSP, and is entered in the memory device SP. The home location register HLR sends the received mobile subscriber roaming number MSRN to the switching device GMSC (10). The switching device GMSC then generates an initial address message IAM and sends the transmitted mobile subscriber roaming number MSRN in this message IAM to the switching device. This switching device is responsible for the subscriber B in the service switching point MSSP (11).

The process of configuring a connection is continued by, first, sending a radio call Pag (Paging) via the base station or base stations to the radio cell or cells of the location area being supervised by the switching device in the service switching point MSSP (9). This transmission is confirmed by a message from the communications terminal MS of the subscriber B. In parallel with or after the paging, the control device SE of the service switching point MSSP initiates (as soon as the previously set triggering event has occurred) a request to tc-beg (begin). The request to begin tc-beg calls data and/or the parameters directly from the service control point SCP (12). The request tc-beg to the service control point SCP includes the correlation information CorrId and parameter information Preq(Parameter request) about what information is desired. In the illustrated example, these are parameters relating to calculation of call charges. Other data or parameters which are preferably passed on to the communications terminal MS in real time may be a special ringing tone, a warning tone, a handover decision, a change in the service currently being used. In the case of a warning tone, the warning tone signals on-line charging or a specific zone when using zone-dependent charging.

The control device SE of the service control point SCP produces a message tc-con(continue) in which, for the case of call charging, it inserts a set comprising a plurality of charging parameters epar and sends back as the response to the request tc-beg to the service switching point MSSP (13). In this case, the parameter set epar comprises first parameters epar1, which are applicable before any tariff switching, and second parameters epar2, which are used after the tariff switching. This means that the service switching point MSSP first of all sends a message CON(Connect) with the first parameters epar1 to the communications terminal MS (14) which determines and possibly indicates the call charge—for example incremental—in a known manner during the already existing connection from the arriving charging parameters. If the service switching point MSSP finds any tariff switching, the service switching point can send immediately a further message PROC(Proceed) for continuing the charge calculation to the communications terminal MS in which case the message PROC now contains the second parameters epar2 (15).

If, in contrast to this, the service control point SCP finds any tariff switching, it sends further charging parameters epar* for calculating call charges in another message tc-con to the service switching point MSSP (16). For its part, the service switching point MSSP in turn initiates the message PROC to continue charge calculation, but sends the new parameters epar* in this message to the communications terminal MS (17). The example clarifies that data such as charging parameters can be requested as often as required by means of a triggered request, and, in particular, even while a connection is actually being set up by the service control point SCP.

Figure 3:
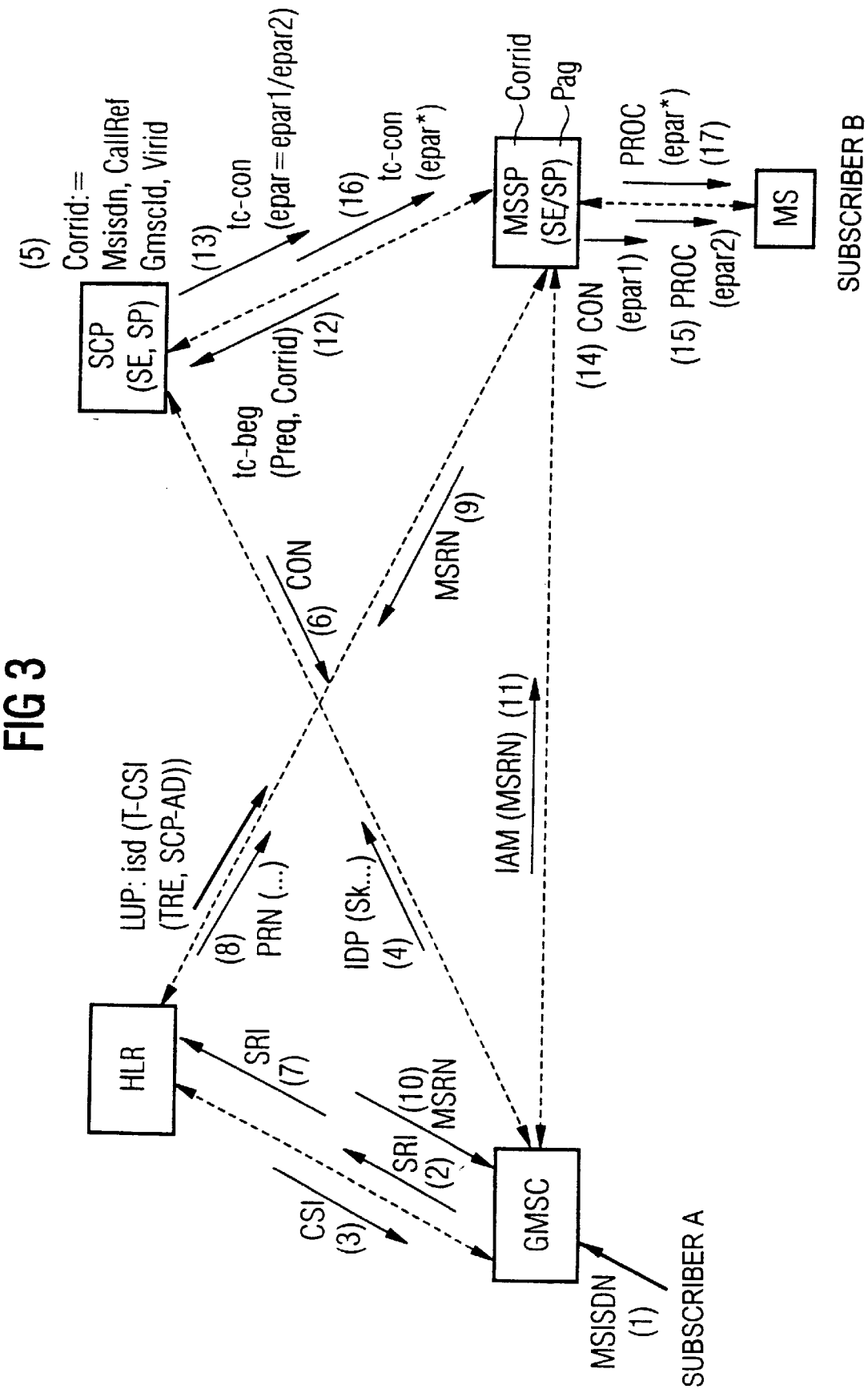

FIG. 3 shows the information transmission according to the invention in the situation where the trigger information is not implemented via the normal two-stage interrogation process shown in FIG. 2, but directly via the location-update procedure to the service switching point MSSP. For this purpose, the home location register HLR responsible for the updating process generates a message LUP(Location Update) with a request isd(insert subscriber data). The message LUP(Location Update) signals that data in the service switching point MSSP needs to be amended or entered. The data needing to be amended or entered can be either in the visitor location register of the switching device or in the memory device SP. The trigger information T-CSI used according to the invention is sent together with the request isd from the home location register HLR to the service switching point MSSP. The trigger information preferably includes the trigger event TRE and the address SCP-AD. The triggering of the request is thus set by information in the service switching point MSSP.

The sequence of configuring a connection is equivalent to that in FIG. 2 with the following differences. First, in step (3) described above with respect to FIG. 2, the home location register HLR provides general information CSI rather than trigger information via a service controlled by the service control point SCP. The known two-stage interrogation for transmission of the mobile subscriber roaming number MSRN is now carried out, with the messages CON and PRN in steps (6) and (9) being transmitted in the normal way without the trigger information and without the indicator shown in FIG. 2. Steps (10) to (17) are identical to the message flow described with respect to FIG. 2. Accordingly, when the stored trigger event TRE arrives in the service switching point MSSP, information transmission starts with the request tc-beg. The requested information (in the present example, the charging parameters epar1, epar2 and epar*) is supplied in the respective message tc-con from the service control point SCP. In this case, the data and parameters can be processed by the service switching point MSSP before they are passed on to the communications terminal MS or the data and parameters can be passed through directly and transparently.

Figure 4:
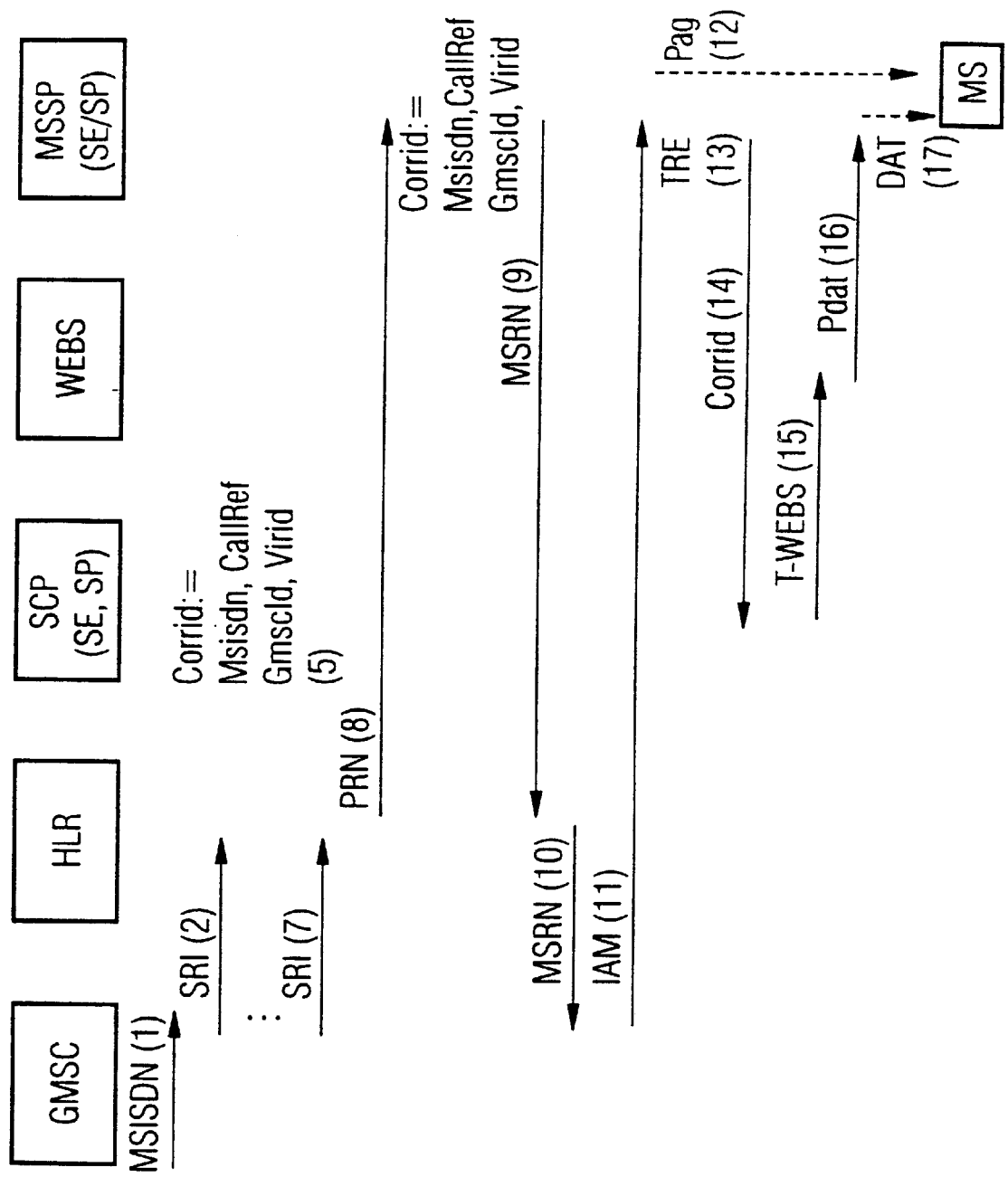

FIG. 4 shows the message flow for information transmission according to the invention for a particular application in which information can be requested via service control-point SCP by an Internet service unit WEBS(Web Server). The message flow between the switching device GMSC, the home location register HLR, the service control point SCP, and the service switching point MSSP, corresponds to that in FIG. 2 or FIG. 3 from step (1) (reception of the mobile subscriber call number MSISDN) to step (11) (transmission of the connection setting-up message IAM). This includes the two-stage interrogation SRI in steps (2) to (7), including the production and storage of the correlation information CorrId in the service control point SCP and the service switching point MSSP, as well as the requesting and transmission of the mobile subscriber roaming number MSRN in steps (8), (9), and (10). The service switching point MSSP or the switching device that controls the subscriber B uses the received mobile subscriber roaming number MSRN to send the radio call pag, in order to produce a connection with the communications terminal MS.

The triggering of the request to transmit the information occurs either via the method shown in FIG. 2 with the two-stage interrogation (relay indication) or via the method shown in FIG. 3 using the direct local-update procedure. Irrespective of the chosen method, the service switching point MSSP initiates message transmission to the service control point SCP as soon as the preset trigger event TRE is satisfied (13). In the process, it sends the correlation information CorrId (14). The correlation information CorrId (14) uses the information requested directly by the Internet service unit WEBS associated with the respective call. The service control point SCP then triggers the Internet service unit WEBS by sending it a message T-WEBS to transmit information (15). The Internet service unit WEBS then sends a message Pdat with information to the service switching point MSSP (16), which passes on the information DAT directly or after processing or pre-processing to the communications terminal MS (17). As an alternative to the above procedure, the Internet service unit WEBS can also be addressed directly by the service switching point MSSP for transmission of the information DAT. Examples of the information which can be called by triggering are e-mails stored in the Internet and advertising.

I claim:

1. A method for requesting connection information during incoming calls, during and after the setting up of a connection, to a subscriber in a communications network, which comprises:

providing communications terminals connected to further devices, the communications terminals granting access to subscribers; networked switching devices connected to the communications terminals, said networked switching device handing over subscribers to a further network; a subscriber database for storing data relating to the subscribers registered in the communications network; and a service switching point and a service control point for administering services;

sending information-request trigger information from the subscriber database during a connection setting-up procedure to the service switching point that is currently responsible for the subscriber while simultaneously storing an information-request trigger event in the service switching point; and requesting the information directly from a service control point by the service switching point when the information-request trigger event is present.

2. The method according to claim 1, which further comprises:

transmitting data and parameters from the service control point via the service switching point to the communications terminal.

3. The method according to claim 2, wherein the data and parameters are passed on transparently from the service switching point to the communications terminal.

4. A method for requesting connection information during incoming calls, during and after the setting up of a connection, to a subscriber in a communications network, which comprises:

providing communications terminals connected to further devices, the communications terminals granting access to subscribers; networked switching devices connected to the communications terminals, said networked switching device handing over subscribers to a further network; a subscriber database for storing data relating to the subscribers registered in the communications network; and a service switching point and a service control point for administering services;

sending information-request trigger information from the subscriber database during a connection setting-up procedure to the service switching point that is currently responsible for the subscriber;

storing an information-request trigger event in the service switching point;

requesting the information directly from a service control point by the service switching point when the information-request trigger event is present;

transmitting data and parameters from the service control point via the service switching point to the communications terminal;

processing the data and parameters with the service switching point; and passing the processed data and parameters to the communications terminal.

5. The method according to claim 1, wherein the service control point has an address stored with the information-request trigger information in the service switching point.

6. A method for requesting connection information during incoming calls, during and after the setting up of a connection, to a subscriber in a communications network, which comprises:

providing communications terminals connected to further devices, the communications terminals granting access to subscribers; networked switching devices connected to the communications terminals, said networked switching device handing over subscribers to a further network; a subscriber database for storing data relating to the subscribers registered in the communications network; and a service switching point and a service control point for administering services;

sending information-request trigger information from the subscriber database during a connection setting-up procedure to the service switching point that is currently responsible for the subscriber;

storing an information-request trigger event in the service switching point;

requesting the information directly from a service control point by the service switching point when the information-request trigger event is present;

sending the information-request trigger information from the subscriber database upon receipt of a request from the switching device, which receives an incoming call;

requesting an indicator for the information directly from the service control point on the basis of an initiating message from the switching device; and sending the information-request trigger information together with the indicator from the switching device via the subscriber database to the service switching point, in a request for transmission of a mobile subscriber roaming number, the mobile subscriber roaming number identifying the location of the subscriber.

7. The method according to claim 1, which further comprises:

sending the information-request trigger information from the subscriber database to the service switching point in a message used for updating the location of the subscriber.

8. The method according to claim 1, which further comprises:

using the correlation information in the service control point and the service switching point; and associating the information requested directly from the service control point with the respective call.

9. A method for requesting connection information during incoming calls, during and after the setting up of a connection, to a subscriber in a communications network, which comprises:

providing communications terminals connected to further devices, the communications terminals granting access to subscribers; networked switching devices connected to the communications terminals, said networked switching device handing over subscribers to a further network; a subscriber database for storing data relating to the subscribers registered in the communications network; and a service switching point and a service control point for administering services;

sending information-request trigger information from the subscriber database during a connection setting-up procedure to the service switching point that is currently responsible for the subscribers;

storing an information-request trigger event in the service switching point;

requesting the information directly from a service control point by the service switching point when the information-request trigger event is present;

transmitting data and parameters from the service control point via the service switching point to the communications terminal;

sending a set of a plurality of parameters from the service control point;

calculating a call charge from a first of the plurality of parameters before any tariff switching determined by the service switching point; and calculating a call charge from a second of the plurality of parameters after the tariff switching.

10. The method according to claim 9, which further comprises:

sending further parameters from the service control point after any tariff switching determined by the service control point, and then calculating the call charge.

11. The method according to claim 9, which further comprises:
   after an information-request trigger event is satisfied, requesting, receiving, and sending to the communications terminal information from an Internet service unit with the service switching point.

12. The method according to claim 11, which further comprises:
   sending correlation information from the service switching point to the service control point by which the Internet service unit requests the correlation information and associates the correlation information with the respective call.

13. A service switching point assembly for requesting information during incoming calls to a subscriber in a communications network comprising:
   communications terminals accessed by subscribers;
   networked switching devices connected to said communications terminals, said networked switching device accessed by subscribers with said communication terminals and connected via further devices and handing over said communications terminals to a further network;
   a subscriber database for storing data relating to said subscribers registered in said communications network; and
   a service switching point and a service control point for administering services, said service switching point having a memory device for storing an information-request trigger event based on said information-request trigger information sent from said subscriber database, and a control device for producing a message which is sent directly to said service control point when said information-request trigger event for requesting information is present.

14. A service switching point assembly for requesting information during incoming calls to a subscriber in a communications network comprising:
   communications terminals accessed by subscribers;
   networked switching devices connected to said communications terminals, said networked switching device accessed by subscribers with said communication terminals and connected via further devices and handing over said communications terminals to a further network;
   a subscriber database for storing data relating to said subscribers registered in said communications network; and
   a service switching point and a service control point for administering services, said service switching point having a memory device for storing an information-request trigger event, said information-request trigger information sent from said subscriber database, and a control device for producing a message which is sent directly to said service control point when said information-request trigger event for requesting information is present;
   said memory device storing data and parameters transmitted from said service control point, and said control device initiating said sending of the data and parameters to said communications terminal.

15. The service switching point according to claim 13, wherein said memory device stores an address of said service control point, from which said information can be requested with said information-request trigger information.

16. A service switching point for requesting information during incoming calls to a subscriber in a communications network comprising:
   communications terminals accessed by subscribers;
   networked switching devices connected to said communications terminals, said networked switching device accessed by subscribers with said communication terminals and connected via further devices and handing over said communications terminals to a further network;
   a subscriber database for storing data relating to said subscribers registered in said communications network; and
   a service switching point and a service control point for administering services, said service switching point having a memory device for storing an information-request trigger event, said information-request trigger information sent from said subscriber database, and a control device for producing a message which is sent directly to said service control point when said information-request trigger event for requesting information is present;
   said control device receiving said information-request trigger information together with an indicator for the information which can be directly requested, in a request to transmit a mobile subscriber roaming number, which identifies the location of said subscriber, and having said memory device store said information-request trigger information together with said indicator.

17. The service switching point according to claim 13, wherein said control device receives said information-request trigger information from said subscriber database in a message that is provided for updating said location of said subscriber.

* * * * *